Oct. 27, 1936.  G. M. BELLANCA  2,058,659
VENTILATION OF AIRPLANES
Filed June 12, 1931
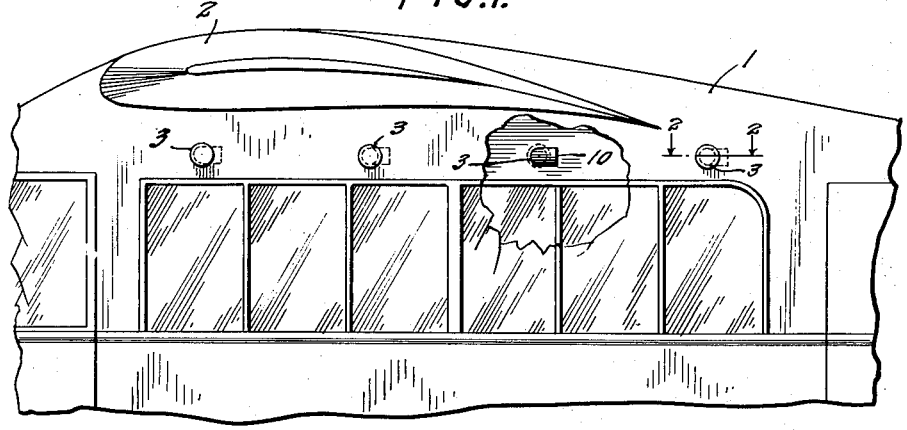
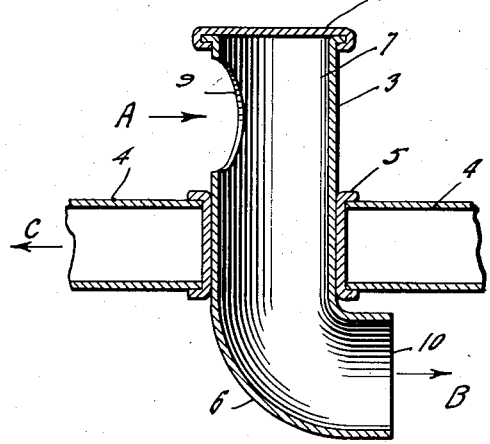
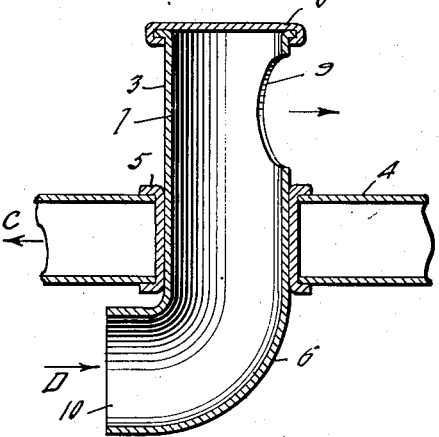
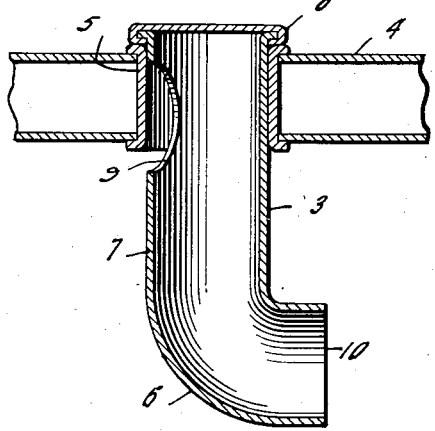
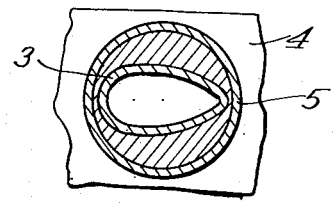
Inventor
GIUSEPPE M. BELLANCA
By Semmes + Semmes
Attorney Patented Oct. 27, 1936

2,058,659

UNITED STATES PATENT OFFICE 2,058,659

VENTILATION OF AIRPLANES

Giuseppe M. Bellanca, New Castle, Del.

Application June 12, 1931, Serial No. 544,012

7 Claims. (Cl. 98—1)

This invention relates to improvements in ventilation of airplanes and more particularly to improved ventilating devices.

The need of ventilating the interior of a cabin type of airplane has long been recognized and some devices for accomplishing this have been proposed. As a general proposition, these comprehend tubular elements which are positioned for rotation in the frame of the fuselage and which project to a greater or less distance beyond the exterior or stream line surface of the fuselage. Usually they are positioned for rotation upon the bearing so that the influx end of the tube may be open to the slip stream or face toward the rear of the airplane so that air from the exterior of the cabin may be aspirated or withdrawn, due to the effect of the stream of air passing over the opening. These structures, as noted, have been so designed as to be permanently extended or projected beyond the outside surface of the fuselage. These types of constructions are disadvantageous because of the fact that they materially increase the parasitic resistance.

It is an object of the present invention to provide an improved type of ventilator for airplanes.

Another object of the invention is to provide an airplane ventilator which may be extended beyond or retracted into the stream line of an airplane.

Yet a further object is to provide a ventilator of the retractible type which may be manipulated to positively direct a current of air, preferably a portion of the slip stream, into the interior of the airplane or to aspirate or otherwise induce a current of air from the interior of the airplane outwardly.

A further object is to provide a rotatable and retractible ventilater of minimum parasitic resistance.

A further object is to provide an improved ventilater of stream line formation.

With these and other equally important objects in view, the invention comprehends the provision of an improved ventilator especially adapted for use on airplanes of the closed cabin type which is so constructed as to be retractible inwardly of the airplane to a position in alignment with the stream line contour of the fuselage, and which further is rotatable upon its bearing so as to direct the inlet or influx opening into the slip stream or diametrically away from the slip stream.

In order to enable a ready comprehension of the invention, typical physical embodiments are shown in the accompanying drawing. This is illustrated with respect to a fuselage of the conventional cabin type.

Fig. 1 is a perspective view of a portion of a typical closed cabin fuselage.

Fig. 2 is a cross section on line 2—2 of Fig. 1.

Figs. 3 and 4 are similar to Fig. 2 showing the ventilator in various of its operative adjustable positions.

Fig. 5 is a cross section of a modification of the structure.

As shown in the drawing, the device of the invention may be employed with an airplane having a cabin fuselage 1 on which is mounted one or more suitable airfoils 2. Preferably the ventilators 3 are positioned above the windows of the cabin, but it will be understood that they may be placed in any desired position, either adjacent the roof or ceiling or close to the floor.

As shown particularly in Figs. 2, 3, and 4, ventilator 3 is mounted for rotation within a suitable portion of the framing or longeron construction shown conventionally by the number 4. The frame support is preferably provided with a suitable bushing or bearing 5 in which the ventilator 3 is mounted, both for rotative and axial movement therein.

The ventilator itself may comprise a generally cylindrical tubular member having a curved or bent portion 6 on its interior end and a relatively straight portion 7 on its other end, and which is adapted to be extended into or retracted out of the slip stream. The outer end of the member is preferably sealed off with a closure 8 so that when the ventilator is in fully retracted position, as shown in Fig. 4, the closure 8 forms substantially a part of the continuous stream line outer surface of the fuselage of the airplane. Near its outer end the ventilator is formed with an aperture or cut out portion 9 which is positioned diametrically opposite the efflux opening 10.

When it is desired to admit air from the exterior to the interior of the airplane the ventilator may be forced axially outward, either manually or by any suitable mechanical means, from the position shown in Fig. 4 to the position shown in Fig. 2. In this position the current of air outside of the cabin, and which preferably constitutes the slip stream, designated by the arrow A, enters the aperture 9 and passes through the hollow conduit and is discharged into the interior of the airplane, as shown by the arrow B. It will be understood that in this position and functioning of the ventilator the arrow C indicates the direction of flight of the plane. When it is desired to withdraw air from the interior of the airplane the ventilator is rotated in the bearing 5 to the position shown in Fig. 3. In this position of the ventilator the slip stream passes over the closed or tubular portion of the exposed part of the ventilator and over the aperture 9. In these circumstances the ventilator acts as an aspirator and air is withdrawn from the interior of the cabin, as shown by the arrow D, outwardly through the interior open end 10 and is aspirated or sucked out by the slip stream through the aperture 9.

When the air within the interior is of sufficient temperature or clarity, or otherwise satisfactory, and it is not desired to ventilate, the ventilator may be retracted to its full retractible position, as shown in Fig. 4, in which position the exterior surface of the fuselage constitutes a continuous stream line contour.

In some circumstances, as where a large number of ventilators are employed or the ventilators are of relatively large size, or it is otherwise desired to reduce the parasitic resistance during that period when the ventilator is extended, this element may be made up in stream line form. In this circumstance as shown in Fig. 5 the member 3', instead of being substantially tubular, is of substantially stream line construction. In order to permit retractibility and rotation in this form of the device, a separate bushing 11 is provided intermediate the member 3 and the bushing 5. This bushing, it will be understood, is formed with a stream line interior surface and a substantially circular exterior surface which rotates upon the bushing 5. In this form of structure the ventilator 3' may be displaced circumferentially in the manner previously described by rotating the bushing 11 upon the bushing 5. Due to its sliding contact with the bushing 11 the ventilator 3' may be moved axially so as to extend it from or retract it into the fuselage.

From the description given it will be seen that an improved form of ventilator construction is provided. This insures all of the improved results of prior structures in that it permits replenishing or exhaustion of air within the cabin of an airplane and at the same time cuts down the parasitic resistance, during operation, to a minimum. When the device is in retracted or inoperative position, parasitic resistance is entirely eliminated. While a preferred form of the invention has been shown and described, it is to be understood that this is purely exemplary, as the invention is conceived to comprehend any airplane ventilator which will function in a comparable manner, namely which will insure proper ventilation of the interior of an airplane and at the same time eliminate or minimize parasitic resistance.

I claim:

1. An airplane ventilator comprising a tubular member having substantially diametrically positioned inlet and outlet openings, the member being mounted in the fuselage for axial and circumferential movement and being so formed as to constitute a substantial continuation of the stream line of the fuselage when in the retracted position.

2. An airship ventilator comprising a tubular member having apertures near each end, the member being rotatable to move one of the apertures into the air stream set up by movement of the airship through the air or to move said aperture to such position that the exterior air stream withdraws air from within the fuselage of the airship, the member being further movable axially to a position in which it constitutes a part of the stream line surface of the fuselage and also adapted to be rotated so as to function as an air inductor and eductor.

3. An airplane ventilator of stream lined form and mounted for lateral movement inboard and outboard of the fuselage and for rotative movement when in the outboard position.

4. A retractable airplane ventilator comprising a substantially hollow tube having substantially diametrically positioned apertures near each end for ingress and egress of air, a closure sealing off the exterior end of the ventilator and which forms a portion of the stream lining of the fuselage when the ventilator is in retracted position means to mount the ventilator for rotation movement so as to cause it to act as an induction and eduction opening when moved to different position.

5. A retractable airplane ventilator comprising a bushing rotably mounted in the fuselage adjacent the skin thereof, the interior surface of the bushing being of stream lined cross section; a hollow tubular member, of corresponding cross section fitted within the bushing and having sliding engagement therewith.

6. In combination with an airplane having a walled cabin for occupants, said wall having an opening, of a tube closed at its outer end, passing through said opening, and turnable with respect to said wall, said tube toward its outer end having an orifice in a side face thereof and being adapted to be turned from within said cabin so that said orifice may be turned between positions facing toward and away from the air craft slipstream, and an elbow on the inner end of said tube and turnable therewith for directing the air passing through said tube in different directions within said cabin.

7. In combination with an airplane having a walled cabin for occupants, said wall having an opening, of a tube closed at its outer end, passing through said opening, and turnable with respect to said wall, said tube toward its outer end having an orifice in a side face thereof and being adapted to be turned from within said cabin so that said orifice may be turned between positions facing toward and away from the aircraft slipstream, and an elbow on the inner end of said tube and turnable therewith for directing the air passing through said tube in different directions within said cabin, said tube being translatable in said wall opening for closing said orifice.

GIUSEPPE M. BELLANCA.